United States Patent

[11] 3,580,309

| [72] | Inventor | Eli Hochstetler<br>Star Route, Millersburg, Ohio 44654 |
|---|---|---|
| [21] | Appl. No. | 795,818 |
| [22] | Filed | Feb. 3, 1969 |
| [45] | Patented | May 25, 1971 |

[54] MACHINE FOR PROCESSING WHEELBARROW HANDLES
8 Claims, 12 Drawing Figs.

[52] U.S. Cl. .................................................. 144/11,
144/110, 144/46, 144/245
[51] Int. Cl. ...................................................... B27m 3/16,
B27c 5/06
[50] Field of Search .......................................... 144/11, 46,
110, 245, 3, 1

[56] References Cited
UNITED STATES PATENTS

| 348,878 | 9/1886 | Albee | 144/11 |
|---|---|---|---|
| 594,825 | 11/1897 | Bump | 144/11 |
| 1,180,280 | 4/1916 | Barnes | 144/110 |
| 1,670,731 | 5/1928 | Miller | 144/110 |

*Primary Examiner*—Donald R. Schran
*Attorney*—Brady, O'Boyle and Gates

ABSTRACT: An apparatus which during a continuous repetitive cycle delivers pieces of lumber, one at a time, to a supporting and clamping means. Each lumber piece in succession is shifted laterally during the supporting and clamping step to a work station where it is firmly held. During the shifting to the work station, each lumber piece is properly positioned longitudinally. While at the work station, plural right-angular drilling means and a handle-shaping means are simultaneously activated to produce true openings transversely through each lumber piece while one end of the piece is being shaped into a handle. Some of the openings are formed at right angles to other openings. The drilling and shaping means are retracted and each handle is released onto a conveyor means for delivery to a coacting sander for the shaped handle portion.

MACHINE FOR PROCESSING WHEELBARROW HANDLES

Wheelbarrow handles are commonly made from sections of 2×2 rough lumber precut into proper lengths. Each lumber piece is approximately square in cross section and may contain knots and other irregularities. The problem is to shape a handle extension on one end of each lumber piece and to drill true openings entirely through each piece transversely at predetermined spaced points with some of the openings perpendicular to other openings. These openings are utilized to bolt the handle to the body of the wheelbarrow and to a leg support and also to the bearing support brackets for the wheel. The openings must be produced uniformly and with accuracy and without splitting the lumber pieces. The lumber pieces are frequently warped when delivered to the processing machine and they must be very securely held and rendered substantially straight for the drilling and shaping operations. No prior art machines are entirely suitable for processing wheelbarrow handles in the above manner and frequently this work is done in a rather awkward and haphazard manner and without achieving a satisfactory end product.

The objective of the invention is to satisfy the need in the art for an efficient machine to process wheelbarrow handles rapidly and with a high degree of accuracy and uniformity and, more particularly, to produce true openings therethrough in right-angular planes while the handles are securely clamped at a processing station. Other features and advantages of the invention will appear during the course of the following description.

BRIEF DESCRIPTION OF THE DRAWINGS

FIG. 6 is an enlarged transverse vertical section taken approximately on line 6–6 of FIG. 5.

FIG. 6a is a vertical sectional view, similar to FIG. 6, showing work supporting and shifting means in a preliminary position.

FIG. 7 is an enlarged fragmentary vertical section taken substantially on line 7–7 of FIG. 5.

FIG. 7a is a similar section showing work supporting and shifting parts in a preliminary position.

FIG. 8 is a fragmentary side elevational view of conveyor and sanding means for the handles.

DESCRIPTION OF THE PREFERRED EMBODIMENT

Figure 1:
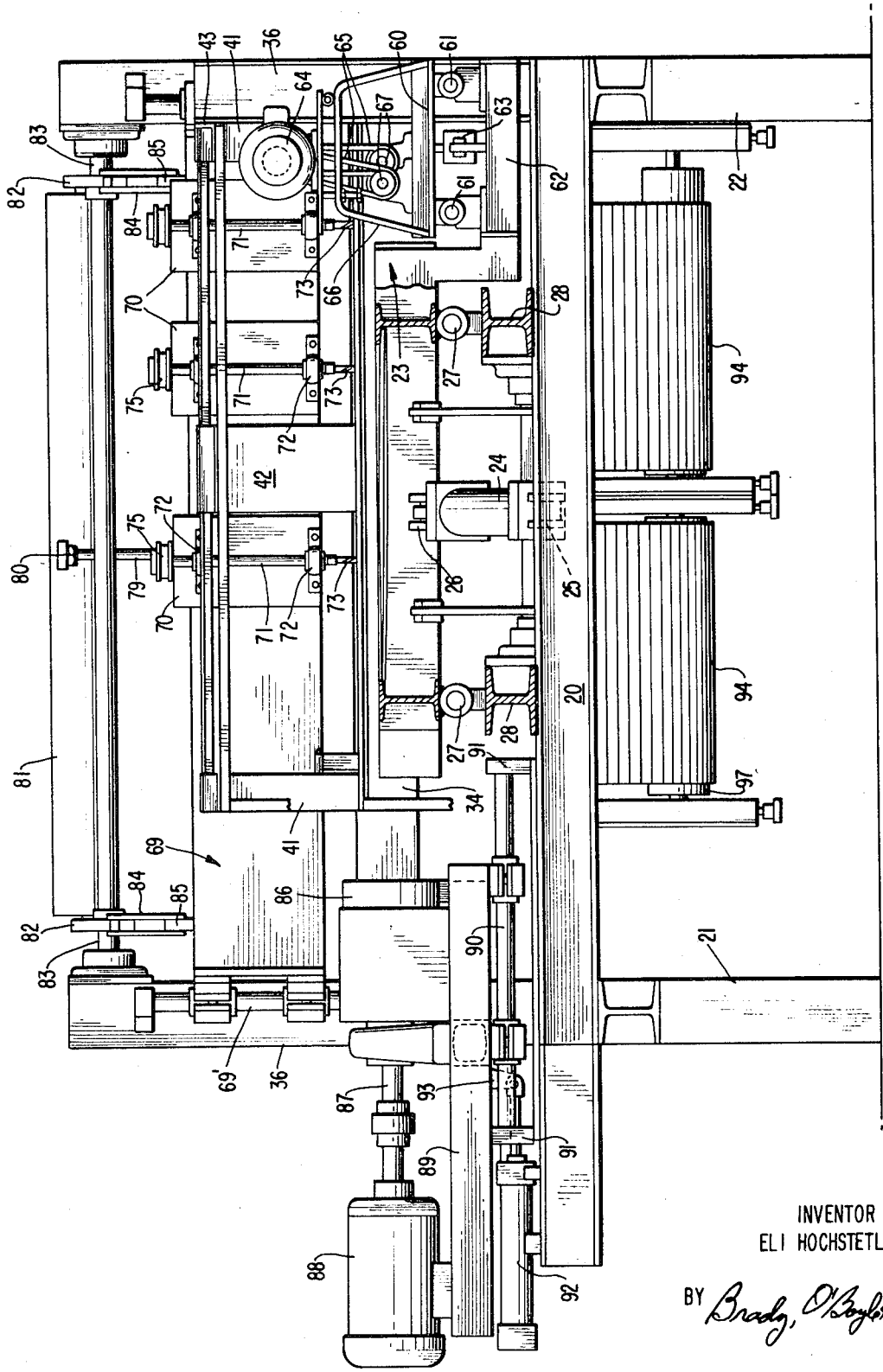
FIG. 1 is a front elevational view of a machine for processing wheelbarrow handles in accordance with the invention.

Referring to the drawings in detail, wherein like numerals designate like parts throughout the same, the machine comprises a main rigid frame including horizontal bed members 20 and front and rear legs 21 and 22 supporting the bed members. A main carriage 23 is mounted for front-to-back horizontal movement on the main frame under influence of an extensible and retractable pneumatically operated cylinder piston unit 24 having a cylinder end rigidly secured at 25 to a portion of the main frame and having its piston rod end pivotally connected at 26 to the main carriage 23.

The main carriage 23 is supported for movement on a pair of parallel horizontal guide bars 27 firmly supported on beam members 28, in turn rigidly mounted upon the bed members 20. At its interior end toward the rear side of the machine, the main carriage 23 carries a clamping head 29 which extends for a considerable distance lengthwise of the machine, FIG. 5, or perpendicular to the path of movement of the main carriage. The clamping head 29 preferably has a wood facing 30 on its leading vertical side, as shown. The clamping head is further equipped on its upper side with friction slide plates 31 rigidly secured thereto for a purpose to be described. An angle bar 32 is also rigidly anchored to the clamping head 29 and projects rearwardly of the facing 30, at right angles thereto and in turn carries a horizontal wooden plank or facing 33 at an elevation well below the slide plates 31, FIG. 7.

A coacting sturdy horizontal clamping bar or member 34 is fixedly secured through another beam member 35 to main frame uprights 36 which are extensions of the rear legs 22. The clamping bar 34 extends horizontally, longitudinally of the machine as shown in FIG. 5, in direct opposition to the clamping head 29 at a slightly higher elevation, FIG. 7.

Figure 5:
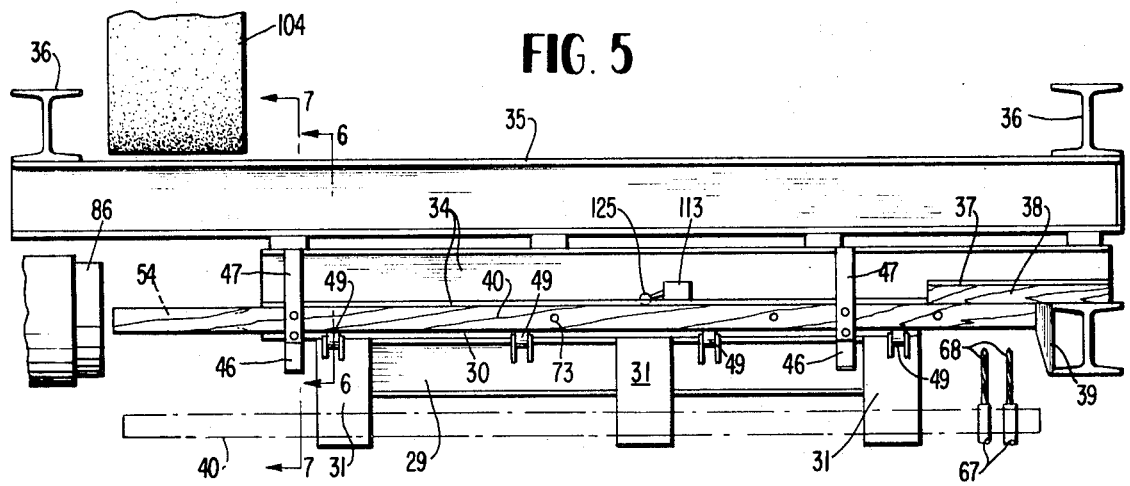
FIG. 5 is a fragmentary plan view of the machine.

Referring to FIG. 5, an end portion of the stationary clamping bar 34 is recessed as shown at 37 and within this recess is mounted a wooden filler element 38 for an important purpose to be described. Projecting forwardly of the filler element 38 and rigid with the clamping bar 34 is a tapering wedge plate 39 whose purpose is to engage each lumber piece 40 while the same is being shifted laterally rearwardly with the main carriage 23 to accurately adjust and position the lumber piece longitudinally immediately prior to clamping the lumber piece both horizontally and vertically.

An overhead delivery arrangement for the precut lumber pieces 40 is provided on the machine near its forward side in the form of curved delivery guides 41 whose upper ends are open and directed forwardly. Preferably there are two end delivery guides 41, FIG. 1, and an intermediate guide 42 near the longitudinal center of the machine. At least one of the end guides 41 preferably has a closed vertical sidewall 43 against which one end of each lumber piece may be engaged for approximate longitudinal positioning. The lower ends of the delivery guides 41 and 42 are open and terminate closely above the main carriage 23 and slide plates 31, FIG. 7. An operator simply places a number of the rough-cut lumber pieces 40 continually into the tops of the delivery guides and maintains a stack of lumber pieces therein at all times during the operation of the machine so that the processing of these pieces into wheelbarrow handles may take place continuously. Preferably, each delivery guide is equipped near its lower end with a pivoted and weighted aligning shoe 44 which nudges approximately the lower three lumber pieces 40 into alignment against the opposing vertical wall portion 45 of the delivery guide. The several lumber pieces 40 are disposed horizontally on their sides in stacked relation and will gravitate freely toward the lower ends of the three delivery guides.

Assuming the main carriage 23 as being retracted to its forwardmost position, FIGS. 6a and 7a, the lowermost lumber piece 40 will simply drop freely onto the wooden facing 33 and will be supported thereon. As the carriage 23 is moved toward the rear of the machine, the vertical facing 30 will push the lowermost lumber piece 40 rearwardly from the bottom of the stack, and the next uppermost lumber piece 40 will gravitate into engagement with the slide plates 31 which will slide thereunder and prevent the next lumber piece from entirely separating from the delivery guides 41, as shown in FIG. 7. The main carriage 23 and the elements 30 and 33 will now carry the separated lumber piece 40 laterally toward the fixed clamping bar 34 until the particular lumber piece is tightly clamped between this bar and the wooden facing 40. Referring to FIG. 5 and to FIG. 7, the lumber piece 40 is also held against the wooden filler element 38 at one end of the bar 34. At this point, the lumber piece is firmly held against lateral displacement.

When assuming the clamped position of FIG. 7, the lumber piece 40 moves beneath spaced holddown shoes 46, connected pivotally with overlying support plates 47, welded or otherwise rigidly secured to the bar 34. The shoes 46 are biased downwardly by strong springs 48 and when the lumber piece 40 slides under the shoes, FIG. 7, it is tightly clamped by the shoes against the underlying wooden facing 33 and thus the lumber piece is secured both horizontally and vertically against movement.

Another means shown in FIGS. 5, 6 and 6a is provided to prevent displacement laterally of the lumber piece 40 while it is being shifted from the position in FIG. 7a to the fully clamped position of FIG. 7. This means comprises a series of retractable spring-loaded clamping rollers 49, carried by arms 50 pivoted at 51 to brackets 52 which are in turn secured to the adjacent delivery guides 41. The arms 50 are biased by torsion springs 53 to the positions shown in FIG. 6a where the rollers 49 are in the direct path of each lumber piece 40 as the same is shifted laterally by the main carriage 23 including clamping head 29. Referring to FIG. 5, the several clamping rollers 49 are shown in laterally spaced relation to the shoes 46 and the slide plates 31. As each lumber piece 40 is shifted laterally to the clamping position of FIG. 7 or FIG. 6, it will be engaged by the rollers 49 which prevent the lumber piece from disengaging the supporting facing 33 during the transfer movement. As the lumber piece moves further toward the clamping position, the springs 53 will yield and the several rollers 49 will simply pass over the top of the lumber piece 40 and assume positions in front of the lumber piece as depicted in FIG. 6 and at this stage, the lumber piece is securely held between the elements 30 and 34 and is also held or clamped by the shoes 46 as described previously. When the main carriage 23, FIG. 6, retracts forwardly, the springs 53 will return the clamping rollers 49 to their normal positions shown in FIG. 6a so that the next lumber piece may be secured by them during the transfer movement to the clamping station. It may now be seen that each lumber piece 40 is transferred laterally in a secure manner from the bottoms of the delivery guides 41 to the clamping or holding station shown in FIG. 7 where the piece is tightly clamped and held against movement in all directions.

Figure 10:
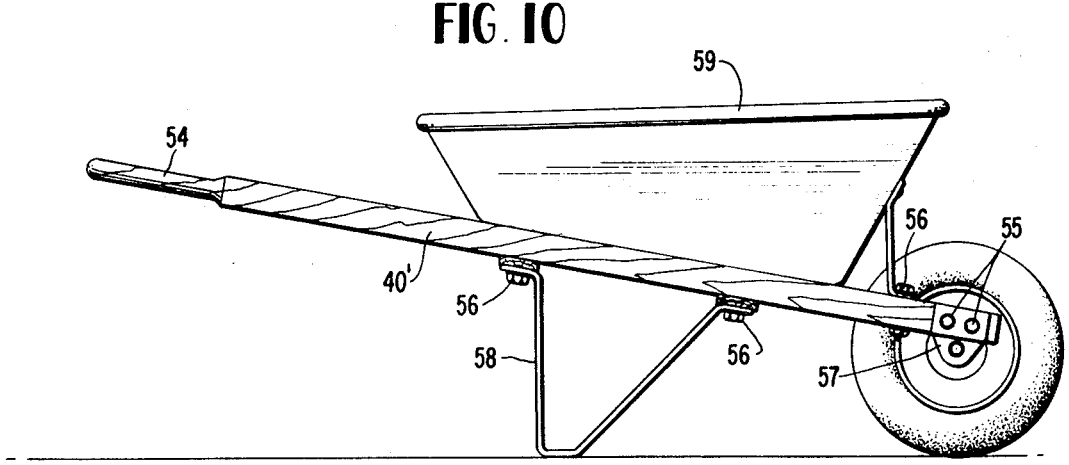
FIG. 10 is a side elevational view of a wheelbarrow including handles processed by the invention machine.

The clamping station shown in FIG. 7 and also in FIG. 5 is the work station of the machine where the several drilling and handle-forming operations are performed simultaneously prior to the release of each workpiece. Referring briefly to FIG. 10 where a conventional wheelbarrow is depicted, each lumber piece 40 at the clamping or work station is processed quickly into one of the handles 40' of the wheelbarrow having a shaped handle extension 54, a pair of true openings 55 drilled therethrough horizontally and preferably three true openings 56 drilled therethrough vertically or at right angles to the openings 55. The openings 55 facilitate the bolting of wheel brackets 57 to the forward ends of the handles and the openings 56 facilitate the attachment of leg braces 58 and the body or tub 59 of the wheelbarrow.

The drilling mechanism for producing the pair of spaced true openings 55 in one end portion of each lumber piece 40 at the clamping or work station comprises a secondary carriage 60 movable horizontally on parallel guide bars 61, FIG. 1, firmly supported on a depressed end section 62 of the main carriage structure 23. The secondary carriage 60 is driven rearwardly and forwardly horizontally on the guide bars 61 by a cylinder piston unit 63 having a connection with the structure 62 and another connection with the secondary carriage 60. The guide bars 61 are parallel to the guide bars 27 of the main carriage 23. The secondary carriage 60 and all associated parts moves with the main carriage 23 rearwardly and forwardly and the secondary carriage can also be moved relative to the main carriage by means of the cylinder piston unit 63.

A drive motor 64 and suitable gearing 65 is bodily mounted on a support member 66 forming a part of the secondary carriage 60 and the gearing 65 operates the rotary spindles 67 of the two horizontal drills 68, FIG. 5, which produce the aforementioned openings 55 in each lumber piece 40 while at the clamping or working station. Thus, with the lumber piece 40 clamped as in FIGS. 5 and 7, the secondary carriage 60 is moved by activation of the cylinder piston unit 63 horizontally toward the rear of the machine and the two drills 68 will pass entirely through the piece 40 and into the wooden filler element 38 behind it to produce a pair of transverse through openings in the workpiece which are true, parallel and perpendicular to the longitudinal axis of the workpiece or handle, and this is accomplished without splitting or chipping the wooden workpiece even if the same is rough and contains knots or other irregularities. It may be mentioned that the lumber pieces 40 as delivered to the machine are frequently warped and another important feature of the invention is that the vertical and horizontal clamping means shown in FIG. 7 serve not only to hold each workpiece firmly but also straighten it substantially for the drilling and handle-shaping operations which are performed simultaneously.

A separate overhead drilling means is provided to simultaneously produce the aforementioned openings 56 in the wheelbarrow handles while at the clamping or work station. This means comprises a main vertically shiftable crosshead 69, FIG. 1, arranged above the clamped workpiece 40 and connected with rigid vertical guide bars 69', rigidly connected with and supported by the main frame uprights 36. Preferably three inverted U-shaped drill rig saddles 70 are mounted on the crosshead 69 and may be adjusted lengthwise of the crosshead to establish the desired spacing of the openings 56 and may be locked in the selected adjusted positions by conventional means. Each saddle 70 carries a vertical drill spindle 71 on the forward side thereof supported in suitable bearings 72 and operating a depending vertical drill 73. The opposite side of each saddle 70 carries a vertical axis drive motor 74 for each associated drill spindle 71 and operatively connected therewith by top gearing 75, preferably in the form of belts.

Figure 4:
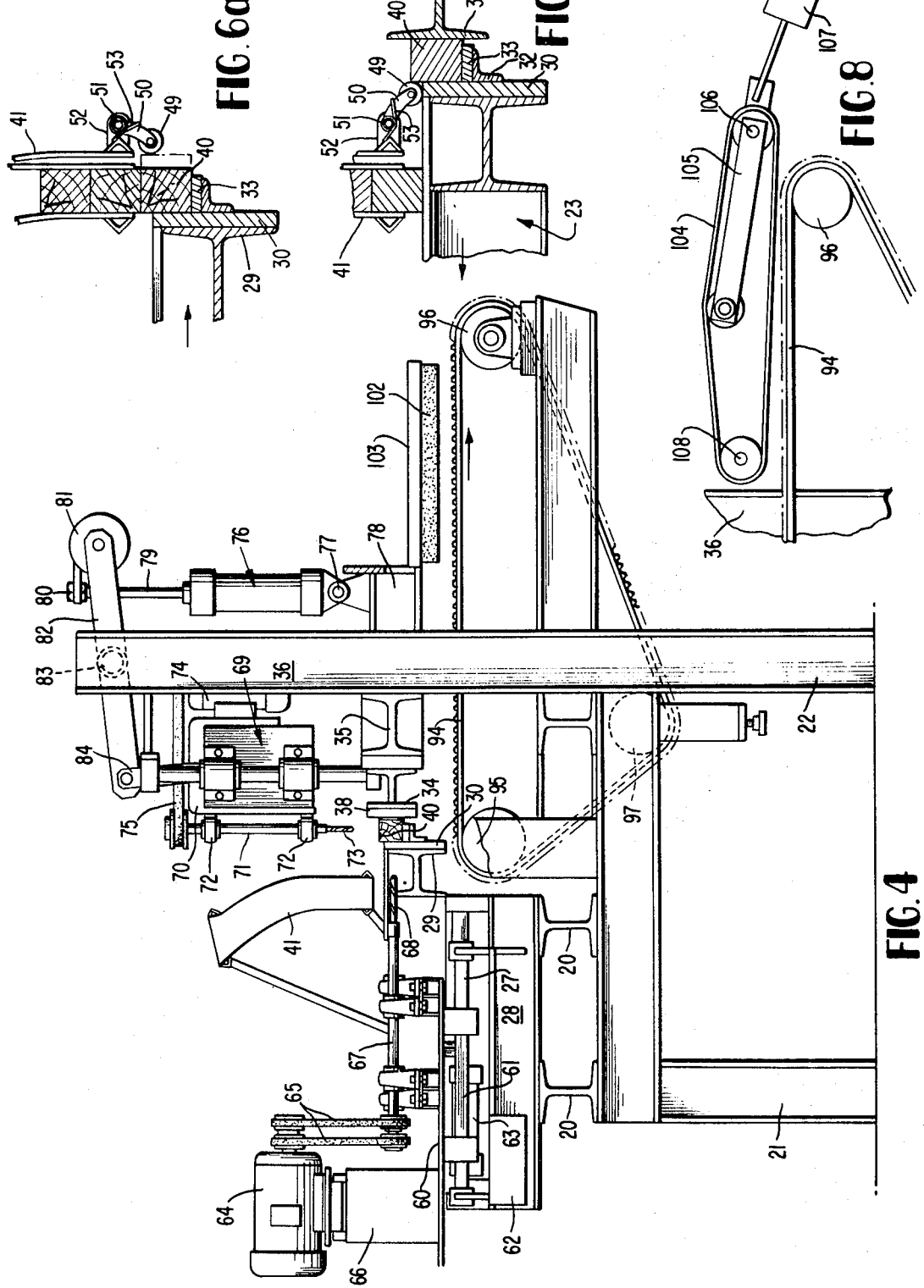
FIG. 4 is an end elevational view looking from the opposite end of the machine.

The entire crosshead 69 and associated drills 73 and drive means is raised and lowered by an upstanding extensible and retractable pneumatically operated cylinder piston unit 76 rearwardly of the crosshead 69 and having its lower end connected at 77 to a short extension 78 of the rigid main frame structure, FIG. 4. The piston rod 79 of unit 76 is connected at 80 to a heavy counterweight 81 secured to the rear ends of vertically swingable arms 82 which are pivoted at 83 to the main uprights 36 and have their forward ends pivotally secured to drive links 84 whose lower ends are connected with lugs 85 on the crosshead 69. Thus, extension of the cylinder unit 76 will drive the vertical drills 73 downwardly into the workpiece 40 and the counterweight 81 will assist the unit 76 in elevating the drills and the crosshead 69 which is quite heavy. As shown clearly in FIG. 4, each workpiece 40, while at the clamped position corresponding to FIG. 7, is properly aligned to receive the drills 73 which produce the openings 56 and the workpiece is also aligned to simultaneously receive the horizontal drills 68 which form the previously described openings 55 at right angles to the openings 56.

Figure 3:
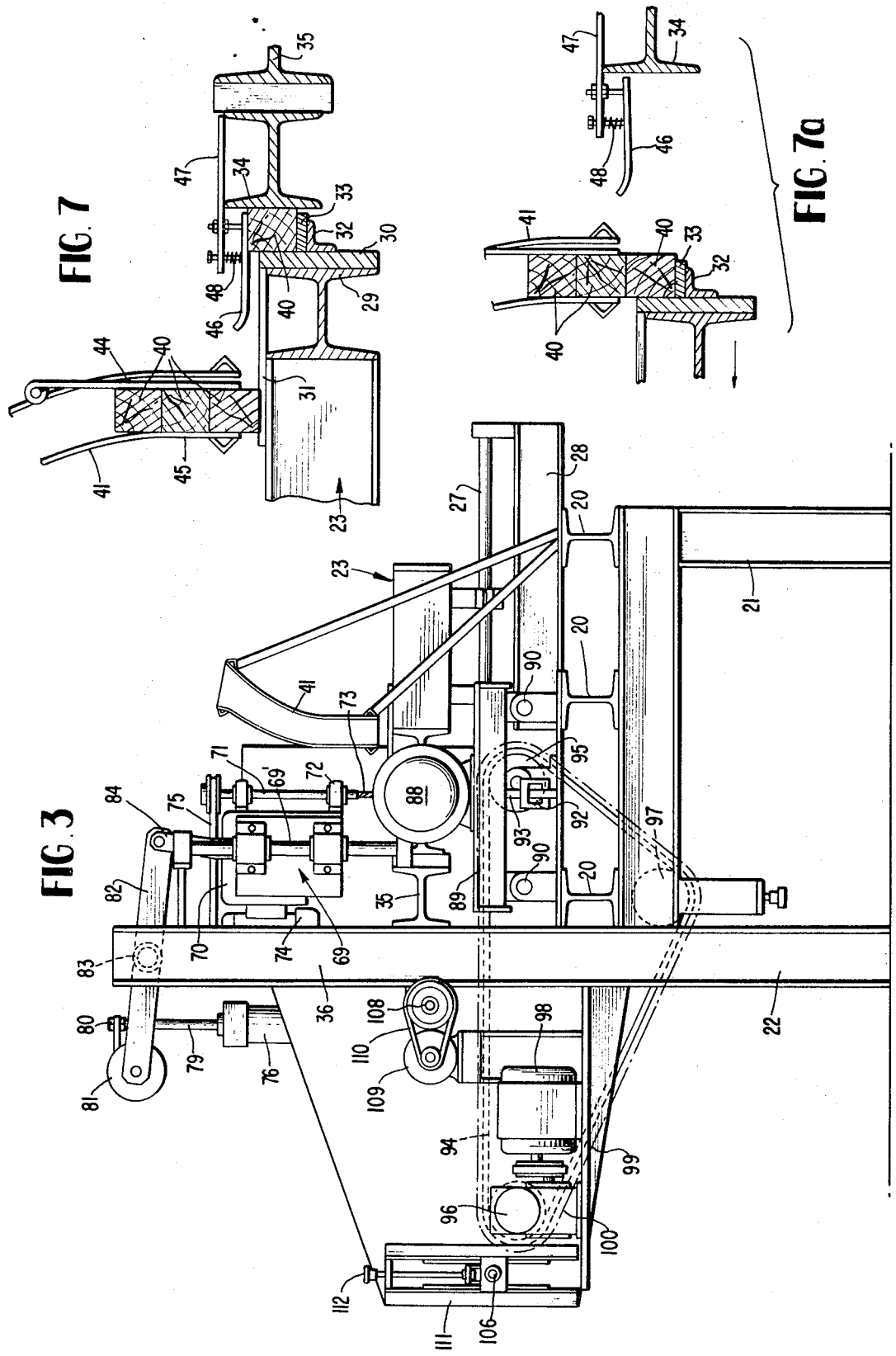
FIG. 3 is an end elevational view of the machine.

The third operation performed on each workpiece 40 at the clamping work station is the shaping of the handle extension 54 in FIG. 10. While at the clamping work station, FIGS. 5, 7 and 4, the workpiece 40 is axially aligned with a rotary shaper tool 86 having internal cutting means of a conventional nature. The rotary portion of the shaper tool or head 86 is powered by a horizontal shaft 87 driven by a motor 88 supported on a carriage 89, FIG. 3, mounted for reciprocation on parallel guide bars 90, securely anchored as at 91 to the main frame of the machine. The carriage 89 is reciprocated by another power cylinder unit 92 having a connection with the main frame and another connection as at 93 with the carriage 89.

When the drills 68 and 73 are activated with their carriage means to drill the right-angular openings 55 and 56, the carriage 89 is also activated by the power cylinder 92 to feed the rotary shaper over the projecting end portion of the workpiece 40, FIG. 5, to produce or shape the handle extension 54 thereon. The handle extension 54 is formed by a single reciprocation of the shaping tool relative to the workpiece and while the workpiece is being securely clamped, as described.

Figure 2:
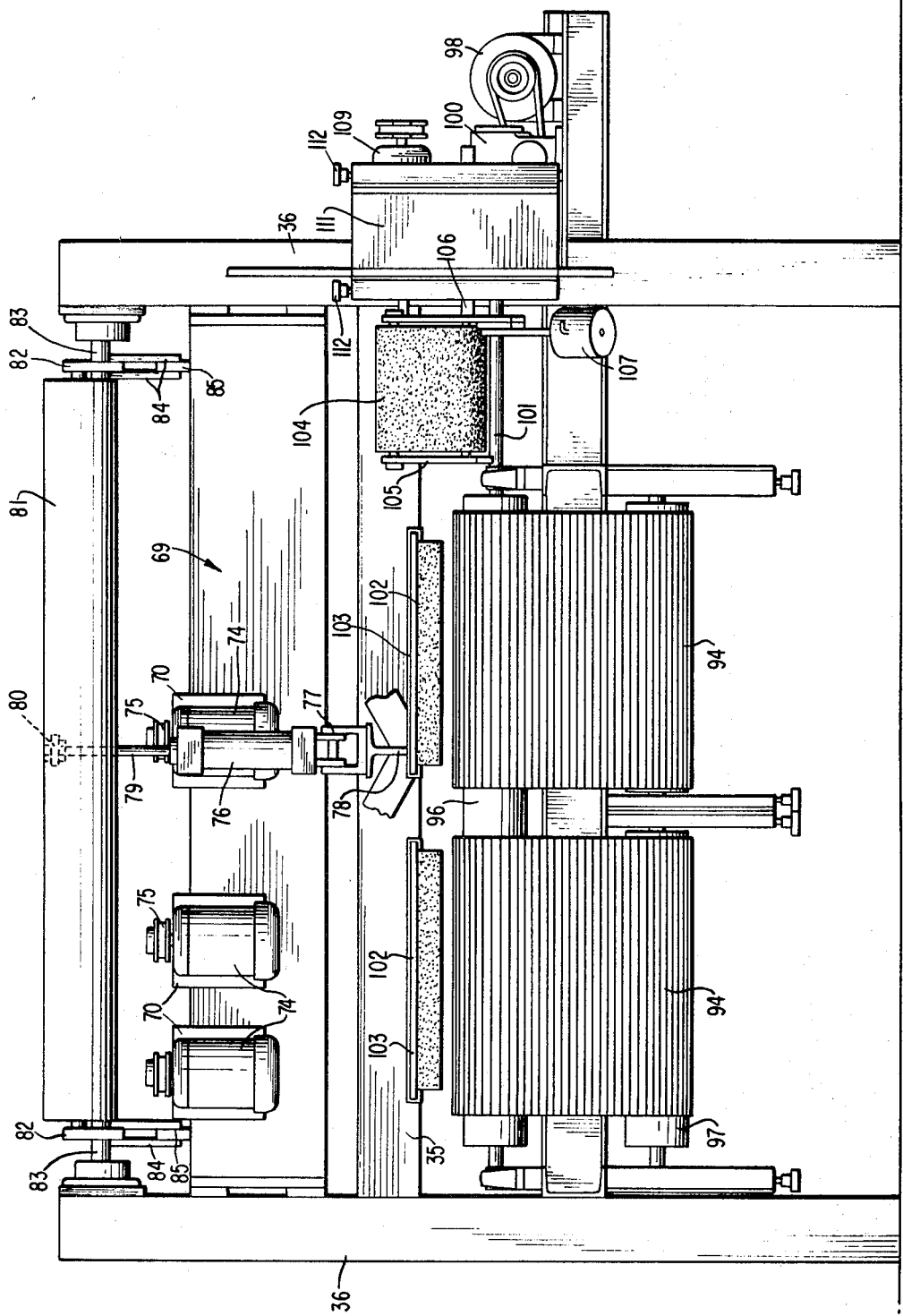
FIG. 2 is a rear elevation of the machine.

When the vertical and horizontal drills 73 and 68 are fully retracted from the workpiece 40 and the shaper tool 86 is also retracted as in FIG. 5, the main carriage 23 is now retracted forwardly by its main cylinder unit 24 and this in turn retracts the elements 30 and 33 and in effect releases the completely processed workpiece which is now the handle 40', FIG. 10. Referring to FIG. 4, the released workpiece will fall onto rearwardly moving ribbed conveyor belts 94 which are in engagement with rolls 95, 96 and 97 suitably mounted on the main frame as best shown in FIG. 2. The roll 96 is powered from a drive motor 98 on a frame extension 99, FIG. 3, operatively connected through a speed reducer 100 with the shaft of powered roll 96, such shaft being shown at 101 in FIG. 2.

Positioned immediately above the belts 94 are soft sponge rubber pads 102, supported in holders 103 which are suitably anchored to the adjacent frame structure of the machine. As the individual handles 40' move with the belts 94 beneath the pads 102, the stationary pads coact with the ribbed belts and cause a turning of the handles on their longitudinal axes as their shaped extensions 54 pass into engagement with a sanding means now to be described.

The sanding means for the shaped handle extensions 54 comprises an endless sanding belt 104 suitably mounted on a frame 105 having a shiftable shaft 106 and a counterweighting means 107, FIGS. 2 and 8. The forwardmost roll 108 for the sanding belt 104 is driven by a motor 109 and gearing 110, as shown. The shaft 106 may be adjusted vertically in a slide structure 111 having screw-threaded operating means 112 and this slide structure is also suitably connected with the main frame of the machine. The frame of the sanding means pivots around the shaft roll 108. When properly adjusted as to height, the sanding belt 104 driven by the roll 108 will sand the turning handle extension 54 of each completed wheelbarrow handle 40' as the latter moves into the sanding belt 104 and is slowly turned on its axis by engagement with the pads 102 and moving belts 94. Upon completion of the sanding operation at the rear of the machine, the completed wheelbarrow handle is discharged into any suitable collection bin or receptacle and this completes the processing of the workpiece or handle.

SUMMARY OF OPERATION

Figure 9:
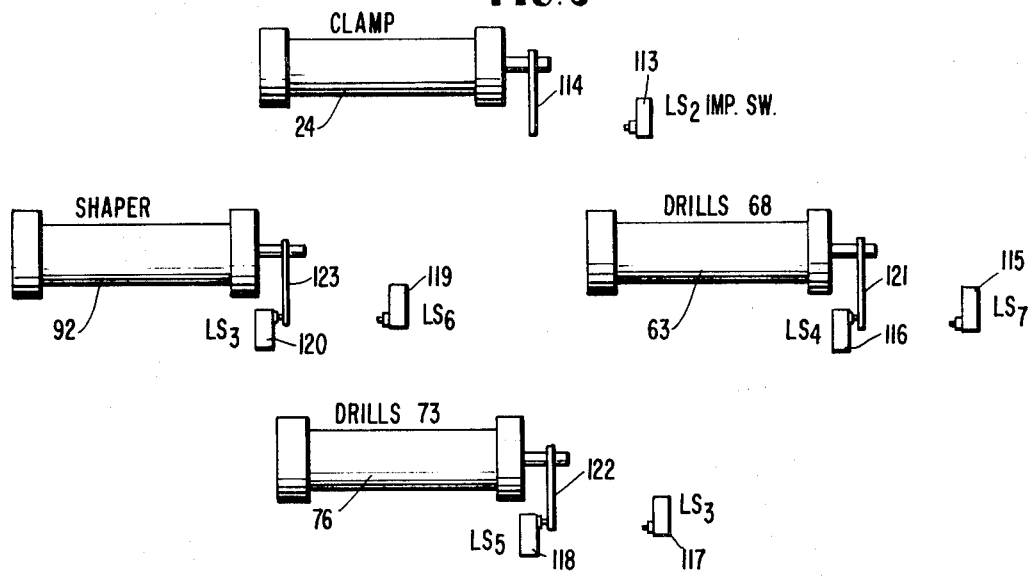
FIG. 9 is a diagrammatic view showing the several power cylinder units of the machine and associated limit switches which control their operation.

While it is thought that the operating cycle of the machine is quite clear from the above description, it is nevertheless desirable to briefly summarize the operating cycle with particular reference to FIG. 9 which is a schematic view of the power cylinder units employed in the machine and the limit switches which control their extension and retraction. It will be understood that the limit switches in FIG. 9 are electrically connected with conventional solenoid-operated valves or the like of a conventional nature, not shown, and these valves regulate the admission and/or exhausting of working fluid such as air into the several cylinders.

Referring to FIG. 9, the cylinder unit 24 for the main carriage 23 is shown in a retracted condition as when the main carriage is forward and away from its clamping position as in FIGS. 6a and 7a. The numeral 113 designates a limit switch suitably mounted on the machine to be closed or actuated by an element 114 on the piston rod of cylinder 24 when the main carriage 23 is in the work-clamping position of FIGS. 7 and 6. Alternately the master switch 113 may be mounted with its actuator 125 extending through the stationary clamp bar 34 to be operated by each workpiece 40 as the latter achieves the full clamping position in FIGS. 5 and 7 caused by movement of the main carriage 23. The closing of the switch 113 will hold the cylinder unit 24 in the work-clamping position and will also complete a circuit to activate the other three power cylinder units 63, 76 and 92 in unison. That is to say, when the main carriage 23 reaches the full clamping position in FIG. 7, all of the other cylinders 63, 76 and 92 will extend in unison to simultaneously feed the horizontal drills 68 into the work, the vertical drills 73 into the work, and the handle-shaping tool 86 will be fed axially of the workpiece 40, FIG. 5. Each of the cylinders 63, 76 and 92 is equipped similarly with extension and retract limit switches 115–116, 117–118 and 119–120 to be operated by actuators 121, 122 and 123 on the piston rods of the several power cylinders or the carriage moved by the cylinders.

A main start switch for the machine, not shown, is manually operated, or operated by each workpiece 40 as it drops onto facing 33, to complete a circuit with the solenoid valve to admit fluid to the cylinder 24 and initially expand this cylinder to move the main carriage 23 toward the work-clamping position. At this position, limit switch 113 is actuated, completing a circuit with solenoid valves which admit fluid to the three cylinders 63, 76 and 92 to expand them in unison, and this advances the drills 68 and 73 into the workpiece 40 and also shifts the shaper tool 86 axially over the workpiece, as explained.

As the cylinders 63, 76 and 92 expand, they disengage limit switches 116, 118 and 120 and at their fully expanded positions, they actuate limit switches 115, 117 and 119 which causes retraction of the three piston rods to their positions shown in FIG. 9 and corresponding to the relative positions of the drills and shaper tool in FIGS. 4 and 5. When the cylinder units 63, 76 and 92 are fully retracted, limit switches 116, 118 and 120 are again actuated and this in turn through a suitable circuit causes retraction of cylinder unit 24 pulling main carriage 23 forwardly and away from its work-clamping position, thus completing the operating cycle.

It is believed that the various advantages and features of the invention may now be readily understood without further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A machine for processing wheelbarrow handles from rough-cut lumber pieces comprising overhead delivery guide means into which plural lumber pieces are placed in succession with the lumber pieces arranged substantially in stacked relation on their sides, a reciprocating lumber-piece carriage and clamping means below the delivery guide means and receiving lumber pieces one at a time from the bottom of the delivery guide means and carrying each lumber piece laterally beyond one side of the delivery guide means, a coacting stationary clamping means spaced from the delivery guide means and engaging each lumber piece in succession on the carriage and clamping means and securing the lumber piece firmly against vertical and horizontal movement, plural drilling means operating substantially at right angles to the lumber piece while the latter is clamped and operable to drill plural spaced parallel through openings in the lumber piece, a shaping tool arranged coaxially with each lumber piece when the latter is being clamped and operable to shape a handle extension on one end of the lumber piece, and power means connected with the plural drilling means and shaping tool to shift the same into engagement with each lumber piece substantially simultaneously and then to retract the drilling means and shaping tool from the lumber piece.

2. The structure of claim 1, and a relatively stationary element having an inclined face in the path of movement of one end of each lumber piece as the lumber piece is being carried laterally toward the stationary clamping means and engaging said one end of the lumber piece to adjust the lumber piece slightly longitudinally on the carriage and clamping means.

3. A machine for processing wheelbarrow handles from rough-cut lumber pieces comprising overhead delivery guide means into which plural lumber pieces are placed in succession with the lumber pieces arranged substantially in stacked relation on their sides, a reciprocating lumber-piece carriage and clamping means below the delivery guide means and receiving lumber pieces one at a time from the bottom of the delivery guide means and carrying each lumber piece laterally beyond one side of the delivery guide means, a coacting stationary clamping means spaced from the delivery guide means and engaging each lumber piece in succession on the carriage and clamping means and securing the lumber piece firmly against vertical and horizontal movement, plural drilling means operating substantially at right angles to the lumber piece while the latter is clamped and operable to drill plural spaced parallel through openings in the lumber piece, a shaping tool arranged coaxially with each lumber piece when the latter is being clamped and operable to shape a handle extension on one end of the lumber piece, and a conveyor means beneath each lumber piece adjacent the stationary clamping means and receiving each lumber piece in succession as it is released by the clamping means, and a coacting means near the conveyor means to sand the handle extension of each lumber piece moving with the conveyor means.

4. The structure of claim 3, wherein the sanding means comprises a yielding pad above the conveyor means engaging each lumber piece on the conveyor means and causing it to rotate on its longitudinal axis, and a sanding belt arranged near one side of the conveyor means and engageable with the rotating shaped handle extension of each lumber piece.

5. A machine for processing wheelbarrow handles from rough-cut lumber pieces comprising overhead delivery guide means into which plural lumber pieces are placed in succession with the lumber pieces arranged substantially in stacked relation on their sides, a reciprocatory lumber piece carriage and clamping means below the delivery guide means and receiving lumber pieces one at a time from the bottom of the delivery guide means and carrying each lumber piece laterally beyond one side of the delivery guide means, a coacting stationary clamping means spaced from the delivery guide means and engaging each lumber piece in succession on the carriage and clamping means and securing the lumber piece firmly against vertical and horizontal movement, plural drilling means operating substantially at right angles to the lumber piece while the latter is clamped and operable to drill plural spaced parallel through openings in the lumber piece in substantially horizontal and vertical planes, said reciprocatory carriage and clamping means includes a substantially right-angular seat having a horizontal seat portion for each lumber piece deposited thereon from the delivery guide means, and said stationary clamping means includes a clamping bar having a vertical clamping face engageable with one side of each lumber piece moved laterally thereagainst by said right-angular seat, an upper spring-loaded clamping shoe means on the stationary clamping means to engage over the top of each lumber piece so that each piece is securely held in four lateral directions during operation of said drilling means, whereby on reciprocal movement of said lumber piece carriage and clamping means said right-angular seat moves away from the lumber piece, whereby it falls away from said vertical clamping face and spring-loaded clamping shoe means at substantially right angles to its lateral movement to the clamped position.

6. The structure of claim 5, and a wooden liner element on the vertical clamping face and on the horizontal seat portion of said right-angular seat so that the plural drilling means may drill entirely through each lumber piece in horizontal and vertical directions.

7. The structure of claim 5, and horizontal slide plate means on the top of said carriage and clamping means moving under the bottom of the delivery guide means when the carriage and clamping means moves toward the stationary clamping means.

8. The structure of claim 7, and resilient retractable holding means for each lumber piece on the delivery guide means in the path of movement of the lumber piece when the latter is being moved laterally by the carriage and clamping means with the lumber piece engaging said right-angular seat, the holding means maintaining the lumber piece on said seat without movement until the lumber piece reaches the stationary clamping means substantially and the holding means then retracting and riding over the top of the lumber piece and clear of the lumber piece.